United States Patent Office 3,370,345
Patented Feb. 27, 1968

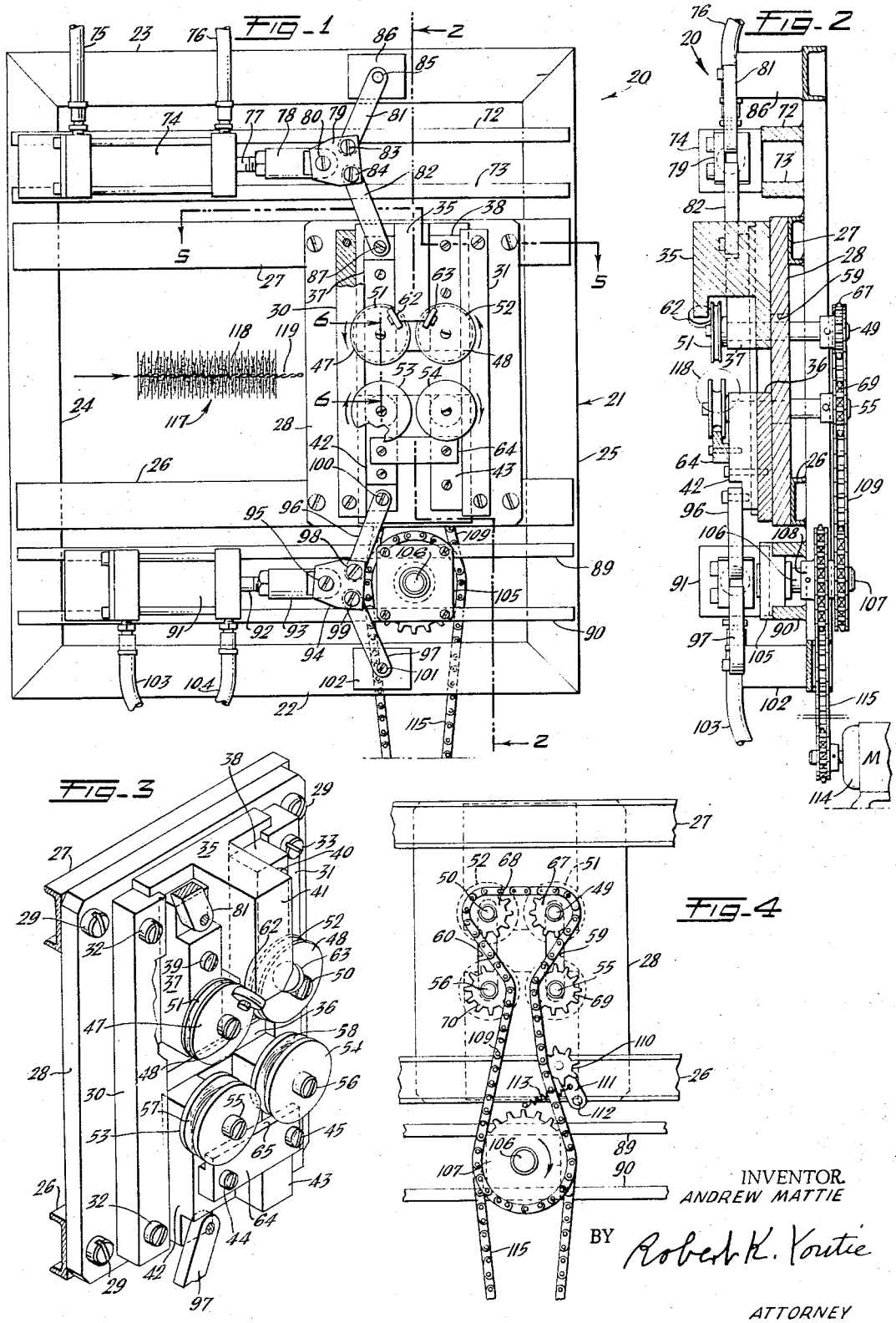

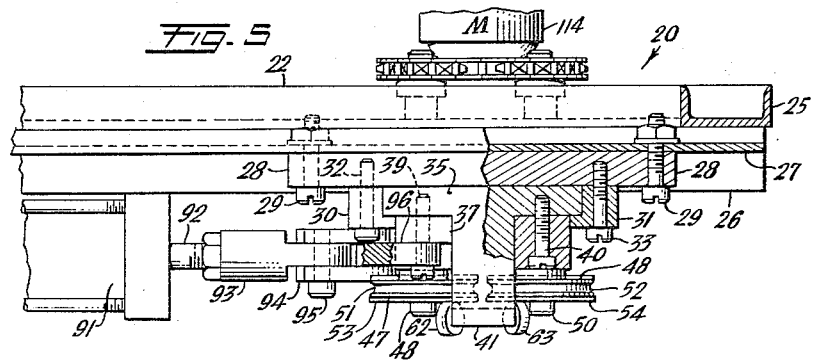
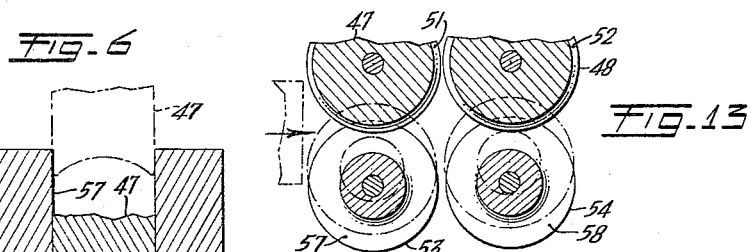
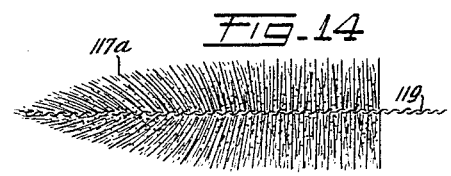
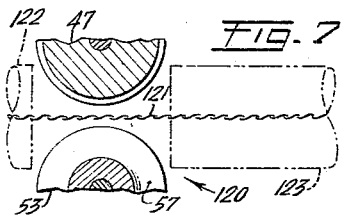
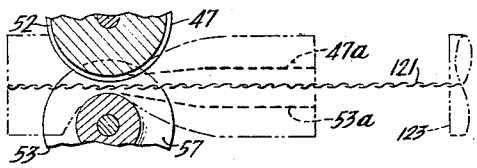
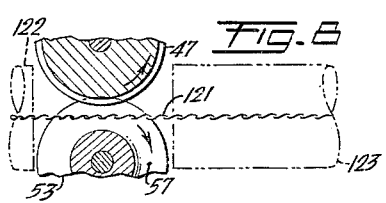
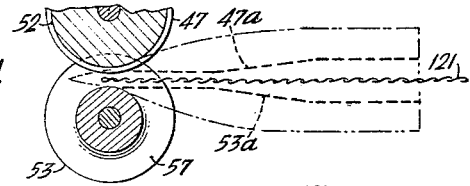
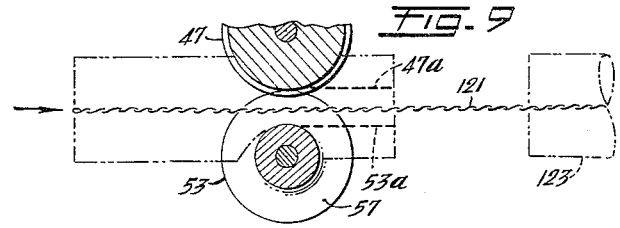

3,370,345
BRANCH-POINTING METHOD AND APPARATUS
Andrew Mattie, Montoursville, Pa., assignor, by mesne assignments, to American Technical Machinery Corp., Mount Vernon, N.Y., a corporation of New York
Filed June 15, 1965, Ser. No. 463,995
19 Claims. (Cl. 29—505)

This invention relates generally to artificial trees, and is especially concerned with a unique method and apparatus for pointing the ends of artificial-tree branches.

It is an important object of the present invention to provide a highly improved method and apparatus wherein artificial-tree branches, say simulating pine trees or the like, may be economically manufactured by mass-production techniques having substantially constant diameter throughout their length, and wherein one end of a branch may be pointed to accurately simulate the natural formation of a tree branch.

It is a further object of the present invention to provide a method and apparatus for pointing an artificial-tree branch which method and apparatus are extremely simple, requiring a minimum of equipment, and which may be quickly and economically performed without the exercise of special skill.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

In the drawings:

FIGURE 1 is a front elevational view showing an apparatus constructed in accordance with the teachings of the present invention;

FIGURE 2 is a sectional elevational view taken generally along the line 2—2 of FIGURE 1;

FIGURE 3 is a partial perspective view, somewhat enlarged, showing a portion of the apparatus of FIGURE 1;

FIGURE 4 is a partial rear elevational view of the apparatus of FIGURE 1;

FIGURE 5 is a partial sectional view taken generally along the line 5—5 of FIGURE 1;

FIGURE 6 is an enlarged fragmentary sectional elevational view taken generally along the line 6—6 of FIGURE 1, illustrating additional positions of roll movement;

FIGURES 7–11 are diagrammatic representations illustrating successive stages in the method of the instant invention;

FIGURE 12 is a longitudinal view, partly in phantom, illustrating the product of the method represented in FIGURES 7–11;

FIGURE 13 is a partial sectional elevational view showing another embodiment of roll arrangement and construction, and illustrating a slightly modified method of the present invention; and FIGURE 14 is a longitudinal view showing a product of the embodiment of FIGURE 13.

Referring now more particularly to the drawings, and specficially to FIGURES 1–5 thereof, the apparatus is there generally designated 20 and may include a generally rectangular frame 21 supported by any suitable means in generally vertical or upstanding position. The frame 21 may include a pair of generally horizontal, lower and upper elongate frame members 22 and 23, and elongate generally vertically disposed side frame members 24 and 25 extending between and rigidly secured to the lower and upper frame members. The members 22, 23, 24 and 25 thus may define a generally rectangular frame. Extending horizontally, in vertically spaced relation intermediate the lower and upper frame members 22 and 23 are a pair of lower and upper intermediate frame members 26 and 27 each having its opposite ends rigidly secured, as by welding or the like, to respective upstanding frame members 24 and 25. A generally vertically disposed mounting member or plate 28 is arranged on the front side of and extends between the intermediate frame members 26 and 27, being fixedly secured thereto, as by bolts 29, or other suitable securing means. The mounting plate 28 may be generally flat and disposed in a vertical plane.

Carried on the front face of the mounting plate 28 are a pair of laterally spaced, generally vertically extending angle-shaped way members or guides 30 and 31. That is, the way members or guides 30 and 31 are each generally L-shaped in cross section, each being secured fast to the plate 28, as by respective fasteners 32 and 33, with one leg extending toward the plate and the other leg extending in spaced parallelism with respect to the plate. Thus, the guides 30 and 31 combine with the plate 28 to define in the space therebetween a vertically extending track adapted to mount a pair of vertically spaced crossheads or slide members 35 and 36. The upper and lower crossheads or slide members 35 and 36 are thus mounted for vertical movement toward and away from each other in the mounting means or track defined by plate 28 and guides 30 and 31.

The upper slide member or crosshead 35 is provided on its forward side with a pair of laterally spaced, forwardly projecting journal supports or blocks 37 and 38. The journal supports 37 and 38 may be detachably fixed to the upper slide member 35 by any suitable means, such as fasteners 39 and 40. Intermediate the blocks 37 and 38, the upper slide member 35 may be provided with a forward extension 41.

The lower slide or crosshead 36 may also be provided on its forward side with a pair of laterally spaced journal support members or blocks 42 and 43, which are suitably secured to the lower slide member, as by fasteners 44 and 45. The upper journal support 37 may be directly over the lower journal support 42, while the upper journal support 38 may be directly over the lower journal support 43.

Carried by the upper journal supports 37 and 38, on the forward side thereof, are a pair of generally coplanar rolls or wheels 48, respectively mounted for rotation about the axes of horizontal shafts 49 and 50 journaled in and extending rearwardly through the journal support blocks 37 and 38. The rolls or wheels 47 and 48 are slightly peripherally grooved, as at 51 and 52, respectively.

Carried on the forward side of respective lower journal support blocks 42 and 43 are a pair of generally coplanar rolls or wheels 53 and 54, as by horizontal shafts 55 and 56 extending rearwardly through and journaled in blocks 42 and 43. The lower rotary rolls 53 and 54 are each provided with substantial peripheral grooves 57 and 58, each of a width approximately equal to or slightly greater than the thickness of the respective rolls 47 and 48. The roll shafts 49, 50, 55 and 56 project rearward through the fixed plate 68, and the latter is provided with vertical slots 59 and 60 movably receiving the shafts upon vertical movement of the slides 35 and 36. As best seen in FIGURE 4, the slot 59 receives vertically superposed shafts 49 and 51, and the slot 60 receives vertically superposed shafts 50 and 56.

Upon vertical movement of the slides 35 and 36 toward each other, the upper wheels or rolls 47 and 48 have their peripheries respectively engageable in the grooves 57 and 58 of the lower wheels or rolls 53 and 54. In order to assure proper alignment of the rolls 47 and 48 for close-fitting engagement in the rolls 53 and 54, a pair of guide wheels 62 and 63 may be rotatably carried by the upper-slide extension 41 for rotating engagement with respective rolls 47 and 48 to prevent wobbling of the latter.

Assuring proper alignment of the lower rolls 53 and 54 for their receiving engagement with the upper rolls 47 and 48 there may be provided a horizontal bar 64 fixed to the journal blocks 42 and 43, as by the fasteners 44 and 45, and having a lip or rib 65 engageable in the lower-wheel grooves 57 and 58.

On the rear side of frame 21, the roller shafts 49, 50, 55 and 56 may be respectively provided with sprocket wheels 67, 68, 69 and 70, all for driving the rolls, as will appear more fully hereinafter.

Also mounted on the frame 21, above the upper intermediate frame member 27, may be a pair of parallel spaced, vertically superposed, horizontally extending frame members or bars 72 and 73. That is, the upper and lower bars 72 and 73 extend between and have their opposite ends rigidly secured, as by welding or other suitable means, to the side frame members 24 and 25. At one location on the bars 72 and 73, adjacent to the frame side members 24, there may be mounted a reciprocatory drive member or cylinder 74, say pneumatically operated in opposite directions, as by conduits 75 and 76 to shift a horizontal piston rod back and forth. On the projecting end of the piston rod 77 is an enlarged head 78 pivotally carrying a connection block 79, as by a horizontal, forwardly and rearwardly extending pivot pin 80. A pair of upper and lower toggle links 81 and 82 each have one end pivoted to the connection block 79, as by pivots 83 and 84. The upper toggle link 81 extends upwardly from the connection block 79 and has its upper end pivoted to the upper frame member 23, as by a pivot pin 85 connected to a block 86 secured on the upper frame member. The lower toggle link 82 depends from the connection block 79 and has its lower end pivoted to the journal block 37 by a horizontal, forwardly and rearwardly extending pivot pin 87. Thus, it will be apparent that upon horizontal reciprocation of the piston rod 77, being actuated by pressure in the cylinder 74 transmitted through conduits 75 and 76, the slide 35 is moved vertically up and down in its guideway or mounting means 28, 30 and 31. Further, substantial force may be imparted to the slide 35 upon downward movement thereof by the toggle action of links 81 and 82.

A similar arrangement may be employed to effect vertical, up-and-down movement of the lower slide 36, there being a pair of vertically spaced, generally horizontally extending lower rails or bars 89 and 90, located below the lower intermediate frame member 26 and extending between and fixedly secured to opposite side frame members 24 and 25. A lower cylinder 91 is disposed generally horizontally and fixedly mounted by any suitable means on the lower bars 88 and 89, and provided with a horizontally extending, longitudinally shiftable piston rod 92. On the outer end of piston rod 92 is provided an enlarged head 93, and a connection block 94 is pivotally connected to the head 93 by a horizontal, forwardly and rearwardly extending pivot 95. A pair of upper and lower toggle links 96 and 97 each have one end pivotally connected to the connection block 94, as by pivots 98 and 99. The upper toggle link 96 extends upwardly from the connection block 94 and has its upper end pivotally connected to the lower journal block 42, as by a pivot 100, while the lower toggle link 99 depends from the connection block 94 and has its lower end pivotally connected to the lower frame member 22 by a pivot 101 secured to block 102 fixed on the lower frame member. The cylinder 91 may be provided with fluid-pressure conduits 103 and 104; and, by actuation of the cylinder through the fluid conduits to reciprocate the piston rod 92, the lower slide member 36 is vertically reciprocated in its mounting means 28, 30 and 31. Obviously, substantial force may be applied in the upward direction of movement of lower slide 36 by the toggle action of links 96 and 97.

Carried by the lower pair of parallel bars 88 and 99, directly below the plate 28, may be a horizontal, forwardly and rearwardly extending journal bearing 105 rotatably supporting a shaft 106 projecting rearwardly of the frame 21. The shaft 106, on its rearward end region may carry a pair of sprocket wheels 107 and 108, see FIGURE 2. A sprocket chain 109 may be trained about the underside of sprocket wheel 107, extending upwardly therefrom between and in meshing engagement with the inner sides of both lower sprocket wheels 69 and 70, and thence outward, about and over the pair of upper sprocket wheels 67 and 68. This arrangement of endless chain 109 is best seen in FIGURE 4. With this arrangement, the sprocket wheel 107 may rotate, as indicated by the arrow in FIGURE 4, to effect simultaneous rotation of sprocket wheels 67, 68, 69 and 70 and rotate their respective shafts 49, 50, 55 and 56 in the directions indicated by the arrows in FIGURE 1. Further, during such rotation the shafts 49, 50, 55 and 56 may be shifted vertically under the control of cylinders 74 and 91, as described hereinbefore, without adversely affecting shaft rotation. A slack-takeup sprocket wheel 110 may be rotatably carried by an arm 111 pivoted at 112 to the frame member 26 and resiliently held in meshing engagement with the chain 109, as by a spring 113.

In order to drive the sprocket wheel 107, a motor 114, see FIGURE 2, may be arranged in driving relation with respect to an endless chain 115 trained about the sprocket wheel 108 on shaft 106.

In practice, suitable controls are provided for operating the motor 114 and actuating the cylinders 74 and 91 to effect simultaneous movement of slides 35 and 36 toward and away from each other.

An artificial-tree branch is designated 117 in FIGURE 1, and may be fabricated of a multitude of filaments 118 twisted in a pair of wires 119 in the manner of a twisted-in wire brush. In the illustrated condition of FIGURE 1, the tree branch 117 includes the filaments 118 all of substantially the same diameter and projecting generally radially from the central twisted wires 119. In operation, the projecting ends of wire 119 are located between one vertical pair of rolls, say rolls 47 and 53, and the rolls moved toward each other to just engage the upper roll 47 in the groove 57 of the lower roll 53. This condition is shown in solid lines in FIGURE 13. Upon rotation of the rolls 47 and 53, and with slight feeding action rightward of the branch 117, the rolls partially deflect the filaments 118 to effect continued rightward feeding of the branch. The rolls 47 and 43 are next moved closer together, further engaging the roll 47 in the groove 57 of roll 53 to very forcibly deflect and squeeze the bristles 118 while feeding the branch 117 through the rolls, the filaments 118 assume a permanent deformation as shown in the branch 117a in FIGURE 14. While two pairs of vertically spaced rolls have been illustrated and described, it is appreciated that the forming action may be achieved with a single pair of vertically aligned rolls. However, two pairs of vertically aligned rolls are preferred, as the full deflecting or squeezing action is thereby applied for a greater period. The relative positions of rolls 47, 48, 53 and 54 in the full deflection or maximum squeezing condition are shown in dashed lines in FIGURE 13. Further, the partial-deflection condition shown in solid lines in FIGURE 13 does not adversely affect the inner or relatively undeflected fibers of the branch 117a when employing two pairs of rolls.

In the apparatus illustrated and described in connection with FIGURES 1–5, both the upper and lower of rolls 47, 48, 53 and 54 are vertically movable, but it is appreciated that only one of the upper or lower need be moved. However, this movement of both upper and lower rolls permits complete separation and disengagement of the rolls for lateral or sideways feeding of a tree branch, if desired. For example, in practice it is often advantageous to fabricate a pair of tree branches at opposite ends of a single set of core wires, the medial region of core wires being devoid of filaments and readily insertable sideways between the upper and lower rolls. In the case of a single branch, as illustrated at 117 in FIGURE 1, the upper and lower rolls need not separate completely, but may only withdraw to the solid-line position of FIGURE 13, and the branch may be inserted endwise, if desired. In FIGURE 6 is shown a relatively withdrawn position of rolls 47 and 53, the former being in phantom, for endwise insertion of an artificial-tree branch. The solid-line position of roll 47 illustrates the full-deflection-and-maximum-interengagement position of the rolls.

The method of the present invention is shown diagrammatically in FIGURES 7–12, only a single pair of upper and lower rolls 47 and 53 being employed. An artificial-tree branch 120 is shown of the double-ended type, including a pair of intertwisted core wires 121 and groups of filaments 122 and 123 twisted in opposite-end portions of the core wires. The medial portion of the core wires contains no filaments.

FIGURE 7 illustrates the fully open position of rolls 47 and 53, with the double-ended branch 120 moved laterally into position between the spaced rolls. The rolls 47 and 53 may then be moved toward each other to their position of partial engagement, as shown in FIGURE 8, and rotated in opposite directions, as shown by the arrows. Roll rotation in the partial-engagement position of FIGURE 8 serves to move the branch 120 rightward by partial-deflecting engagement with the filaments 122, as shown in FIGURE 9. This partial deflection of filaments is sufficient to feed the branch through the nip of rolls 47 and 53 without appreciable deformation of the filaments.

After feeding movement of the branch 120 about one third of the extent of filaments 122, the rolls 47 and 53 are moved to their full engagement, as shown in FIGURE 10, and progressively effect increased deflection of bristles 122 while simultaneously feeding the branch between the rolls.

For the remainder of branch feeding between the rolls, the rolls remain in their fully engaged condition shown in FIGURE 11 for maximum deflection and deformation of the extremity of the branch. The path of roll movement relative to the filaments is shown by dashed lines 47a and 53a in FIGURES 9–11.

The double-ended branch 120 is shown in FIGURE 11 having one end thereof formed by the method of the present invention. It is only necessary to reverse the branch and perform the same forming method on the other end to complete the forming of a double-ended branch.

From the foregoing, it is seen that the present invention provides a method and apparatus for pointing the branches of artificial trees, which method and apparatus fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In the method of pointing an artificial-tree branch, the steps which comprise: providing an artificial-tree branch having generally radial needles, and rolling said branch under increasing pressure toward one end of the branch to permanently deform said needles in the direction of rolling to form a pointed end thereon.

2. The method according to claim 1, further characterized in constricting said needles during rolling in the direction normal to rolling.

3. The method according to claim 1, wherein said rolling is effected by inserting said branch between positively driven rolls for branch movement through the space between the rolls.

4. The method according to claim 3, further characterized in effecting relative movement of the rolls toward each other during said branch movement.

5. In the method of manufacturing an artificial pointed tree branch, the steps which comprise: spirally twisting together a pair of wires with filaments between the wires and extending radially therefrom, inserting the twisted wires and filaments between rolls defining a space therebetween, smaller than the external dimension of said twisted wire and filament assembly, rotating the rolls in opposite directions to move the twisted wire and filaments longitudinally of the wire substantially tangentially of and between the rolls, and effecting relative movement of the rolls toward each other during roll rotation to progressively increase roll pressure and deform said filaments in the direction of movement of said twisted wire and filament assembly to form a pointed end on said twisted wire and filament assembly.

6. The method according to claim 5, further characterized in constricting said filaments in the direction normal to the rolling pressure.

7. Apparatus for pointing an artificial-tree branch, said apparatus comprising a frame, a pair of rolls, journal means supporting said rolls in generally coplanar relation on said frame for rotation about generally parallel axes to receive a tree branch therebetween, mounting means mounting said journal means for relative movement normal to said axes to move said rolls toward and away from each other, first drive means for rotating said rolls in opposite directions to feed a received branch through the nip of said rolls, and second drive means for moving said journal means during rotation of said rolls to move said rolls together and apply increasing pressure to a received branch.

8. Apparatus according to claim 7, one of said rolls having a peripheral groove configured to closely receive the other roll, the periphery of said other roll being movable toward and away from the bottom of said groove upon said relative movement.

9. Apparatus according to claim 7, said first drive means comprising a rotary drive connected in driving relation with said rolls.

10. Apparatus according to claim 7, said mounting means comprising ways on said frame supporting at least one of said journal means for movement relative to said frame.

11. Apparatus according to claim 10, said second drive means comprising a reciprocatory drive connected to said one journal means.

12. Apparatus according to claim 7, in combination with an additional pair of rolls rotatably supported by said journal means in coplanar relation and respectively aligned with the rolls of said first-mentioned pair for relative movement with said journal means, said first drive means being operatively connected to said additional pair of rolls to rotate the same in opposite directions.

13. In the method of pointing a bristled article, the steps which comprise: providing a twisted wire article having generally radial bristles, and rolling said article under increasing pressure toward one end of the article to permanently deform said bristles in the direction of rolling to form a pointed end thereon.

14. The method according to claim 13, wherein said rolling is effected by inserting said article between positively driven rolls for article movement through the space between the rolls.

15. The method according to claim 14, further characterized in effecting relative movement of the rolls toward each other during said article movement.

16. In the method of manufacturing a bristled pointed article, the steps which comprise: spirally twisting together a pair of wires with filaments between the wires and extending radially therefrom, inserting the twisted wires and filaments between rolls, defining a space therebetween, smaller than the external dimension of said twisted wire and filament assembly, rotating the rolls in opposite directions to move the twisted wire and filaments longitudinally of the wire substantially tangentially of and between the rolls, and effecting relative movement of the rolls toward each other during roll rotation to progressively increase roll pressure and deform said filaments in the direction of movement of said twisted wire and filament assembly to form a pointed end on said twisted wire and filament assembly.

17. The method according to claim 16, further characterized in constricting said filaments in the direction normal to the rolling pressure.

18. Apparatus for pointing an article having bristles between twisted wires, said apparatus comprising a frame, a pair of rolls, journal means supporting said rolls in generally coplanar relation on said frame for rotation about generally parallel axes to receive a bristled article therebetween, mounting means mounting said journal means for relative movement normal to said axes to move said rolls toward and away from each other, first drive means for rotating said rolls in opposite directions to feed a received article through the nip of said rolls, and second drive means for moving said journal means during rotation of said rolls to move said rolls together and apply increasing pressure to a received article.

19. Apparatus according to claim 18, one of said rolls having a peripheral groove configured to closely receive the other roll, the periphery of said other roll being movable toward and away from the bottom of said groove upon said relative movement.

References Cited

UNITED STATES PATENTS

| | | | |
|---|---|---|---|
| 614,819 | 11/1898 | Albasini | 18—11 X |
| 2,072,560 | 3/1937 | Kranz et al. | 29—505 |
| 2,580,378 | 12/1951 | Peterson et al. | 300—21 |
| 2,958,126 | 11/1960 | Shaw et al. | 29—433 |
| 3,059,366 | 10/1962 | Kafka et al. | 29—505 X |
| 3,071,415 | 1/1963 | Beck | 300—21 X |
| 3,123,906 | 3/1964 | Frink | 29—433 |
| 3,254,923 | 6/1966 | Marks et al. | 300—21 |
| 1,705,767 | 3/1929 | Iwaza | 300—18 |

CHARLIE T. MOON, *Primary Examiner.*